United States Patent [19]

Takahashi

[11] Patent Number: 5,602,521
[45] Date of Patent: Feb. 11, 1997

[54] ELECTRONIC DEVICE WITH LIGHT

[75] Inventor: Tomohiro Takahashi, Chiba, Japan

[73] Assignee: Seiko Instruments Inc., Japan

[21] Appl. No.: 325,812

[22] Filed: Oct. 19, 1994

[51] Int. Cl.[6] ................................................. G08B 27/00
[52] U.S. Cl. ..................... 340/326; 340/330; 340/384.1; 340/384.6; 368/72; 368/223; 368/255
[58] Field of Search .................................. 340/326, 330, 340/384.1, 384.6, 384.7, 384.71, 815.69, 815.79; 368/11, 43, 72, 73, 94, 98, 109, 223, 255

[56] References Cited

U.S. PATENT DOCUMENTS

| | | | |
|---|---|---|---|
| 4,288,784 | 9/1981 | Fusco | 340/326 |
| 4,499,453 | 2/1985 | Right | 340/326 |
| 4,518,946 | 5/1985 | Solomon | 340/326 |
| 4,982,141 | 1/1991 | Pace et al. | 315/169.3 |
| 5,132,659 | 7/1992 | Kuo | 340/326 |

FOREIGN PATENT DOCUMENTS 2104255  3/1983  United Kingdom.

Primary Examiner—Donnie L. Crosland
Attorney, Agent, or Firm—Adams & Wilks

[57] ABSTRACT

An electronic device with a display having a light source, such as an electroluminescent element, becomes easier to see and is reduced in size and power consumption when a single boosting element is used for selectively driving the light source and an additional element, such as an alarm. A sound generating circuit charges and discharges with a boosted voltage a charge boosting element, such as a piezoelectric element, in accordance with a control signal supplied by an alarm signal generating circuit. A light source disable circuit discriminates when a signal is being output by an alarm signal generating circuit, and disables a boosting circuit and a discharge circuit used for driving the light source, respectively. The light source disable circuit distinguishes between a driving pulse for driving a light source such as an electroluminescent element to light a display and a control signal from an alarm signal generating circuit for driving a piezoelectric element to sound a buzzer, thereby enabling the selective lighting of the display or the generation of an alarm with only one boosting element.

20 Claims, 5 Drawing Sheets

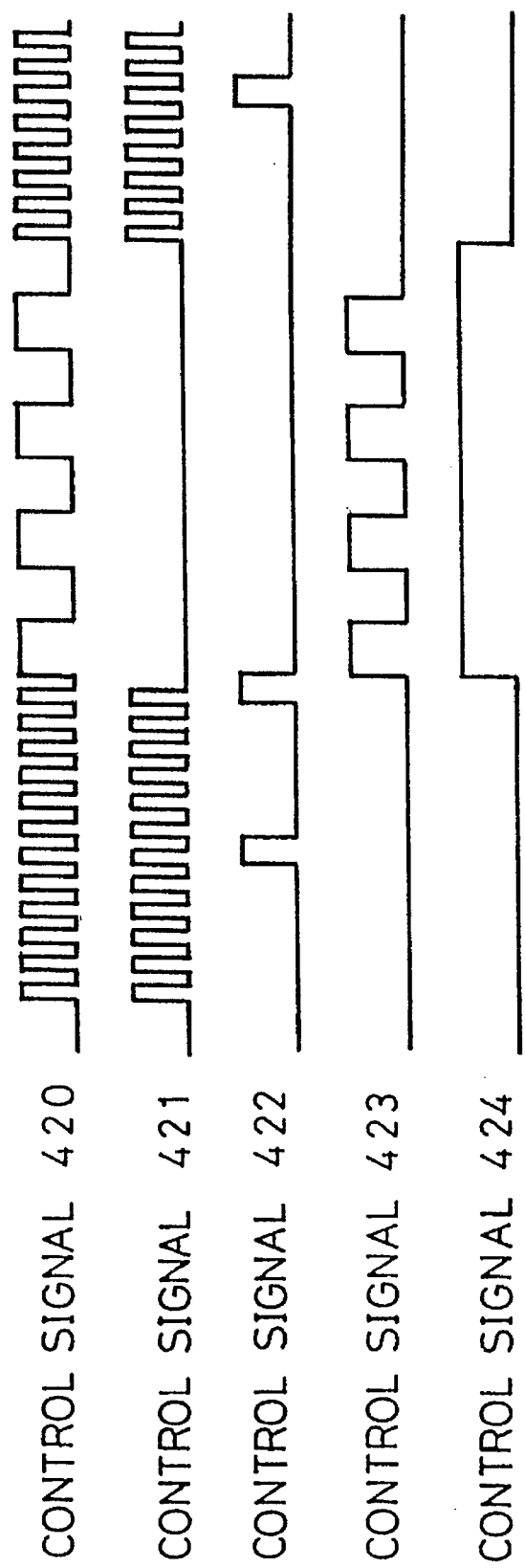

ELECTRONIC DEVICE WITH LIGHT

BACKGROUND OF THE INVENTION

The present invention relates to an electronic device with a light having a device for driving an electroluminescent element (hereinafter referred to as an "EL") using a low voltage current source as a power source.

Conventionally, electronic devices with lighted displays and electronic watches incorporate small heating bulbs for use as a device for lighting a use display, or use light emitting diode (LED) as the lighting device.

Some electronic devices with lighted displays incorporating an LCD panel are equipped with a back-light supplied by an EL. In the field of electronic watches, an EL is generally used as a device for lighting a display element.

However, in a device for lighting a display used in the conventional electronic device with light, since the light source has linear output characteristics, it is difficult to read a whole display when it is a rather display display.

Further, though luminous paint has been applied on the display instead of light, the display cannot be clearly recognized because of a small light source.

SUMMARY OF THE INVENTION

Therefore, an object of the present invention is to obtain an electronic device with a light which has a display easy to see and which can also can drive a buzzer with a low voltage current source and one level-up element.

In order to solve the above problem, the present invention has a piezoelectric element; alarm signal generating means; alarm driving means for charging and discharging a boosted voltage obtained from a charge boosting element to the piezoelectric element, in accordance with a control signal outputted from the alarm signal generating means; and control means for recognizing a signal outputted from the alarm signal generating means and outputting control signals to disable a boosting means and discharge means respectively; thereby enabling an EL and an alarm to be driven with a single boosting element.

In the inventive electronic device with light, an alarm driving circuit 107 charges and discharges a boosted voltage which is obtained from a boosting element 102, to a piezoelectric element 106 in accordance with a control signal that is outputted from an alarm signal generating circuit 111.

Control signal inhibiting circuit 105 recognizes a signal that is outputted from the alarm signal generating circuit 111, and then outputs control signals to boosting signal generating means 104 and discharge signal generating circuit 110 from outputting any signal, respectively, to the thereby disable boosting signal generating circuit 104 and discharge signal generating circuit 110.

Further, a control signal inhibiting circuit 105 recognizes a driving pulse for driving an EL element 112 and the piezoelectric element 106 thereby enabling the EL element 112 to be luminescent and a buzzer to sound with the one incorporated boosting element.

BRIEF DESCRIPTION OF THE DRAWINGS

FIG. 5 is a timing chart of the control signal showing operation of the second embodiment of the electronic device with display light according to the present invention.

DETAILED DESCRIPTION OF THE PREFERRED EMBODIMENTS

Hereinafter, embodiments of the present invention will be explained in accordance with drawings.

(1) First Embodiment

Figure 1:
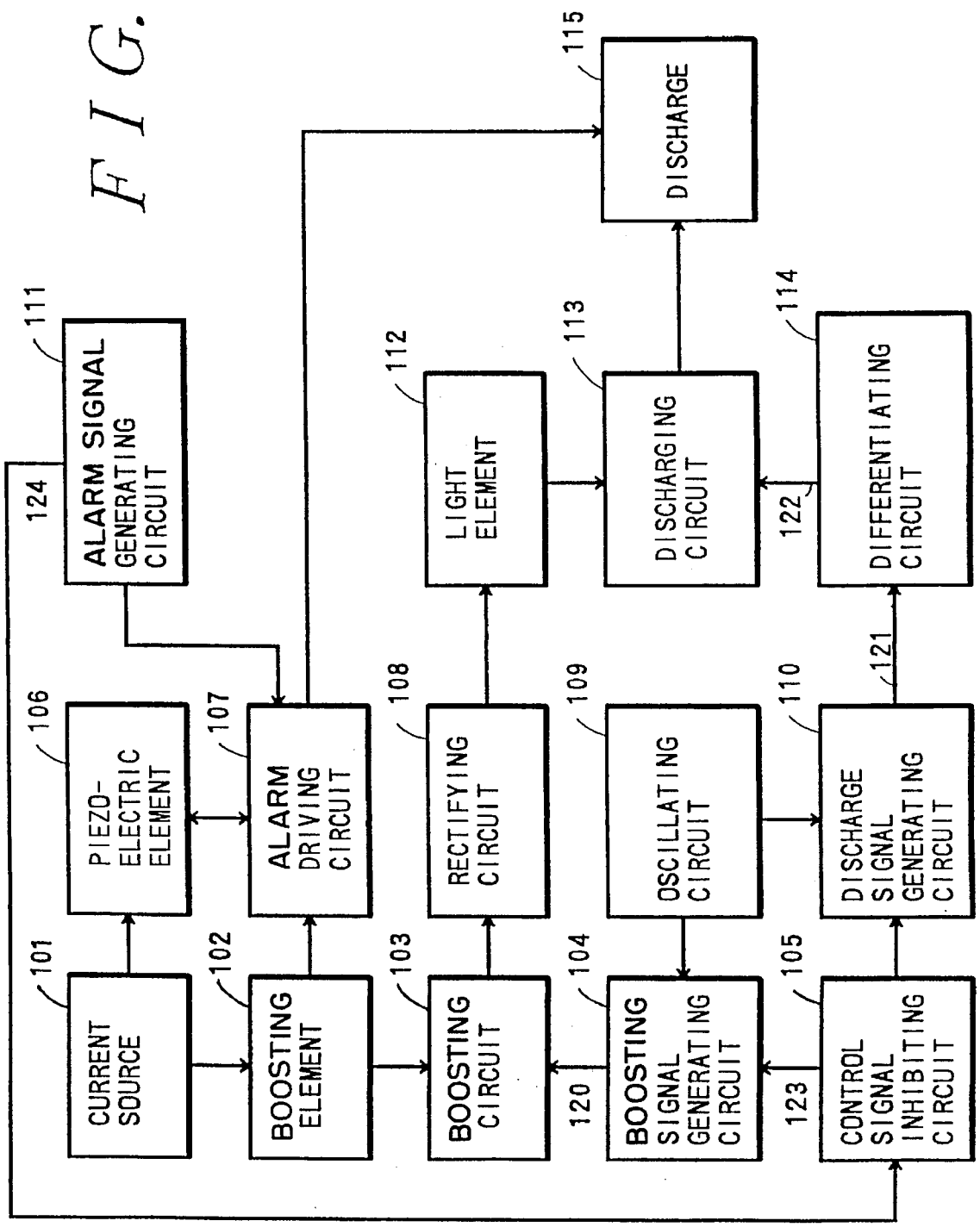
FIG. 1 is a block diagram showing the first embodiment of the electronic device with display light according to the present invention.
Figure 2:
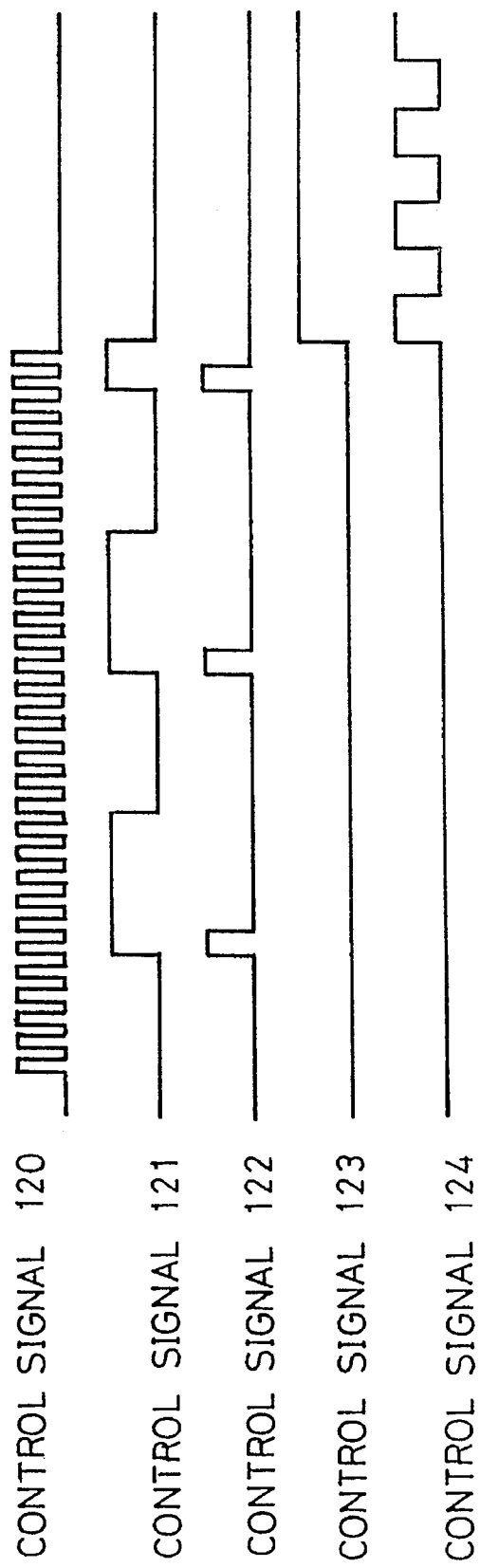
FIG. 2 is a timing chart of the control signal showing operation of the first embodiment of the electronic device with display light according to the present invention.

In FIG. 1 and FIG. 2, when a current source 101 is turned on, an oscillating circuit 109 begins to operate. Signals that are outputted from the oscillating circuit 109 are inputted into a boosting signal generating circuit 104 and a discharge signal generating circuit 110. A boosting circuit 103 begins to operate in accordance with a control signal 120 outputted from the boosting signal generating circuit 104.

An operation of the boosting circuit 103 makes a boosting element 102 generate a boosted voltage. The boosted voltage generated by the boosting element 102 and the boosting circuit 103 passes through a rectifying circuit 108 and is charged into a light element 112, and then the light element 112 becomes luminescent.

Before the light element charged with electric charges becomes overcharged, the discharge signal generating circuit 110 outputs a control signal 121. The control signal 121 is inputted into a differentiating circuit 114, and then is outputted as a control signal 122, and then supplied to a discharging circuit 113. The discharging circuit 113 inputted with the control signal 122 discharges the electric charges that are charged in the light element 112 in accordance with the control signal 122.

The present invention repeats the above operation, thereby operating as a lighting device.

When a control signal 124 is outputted from the alarm signal generating circuit 111, the control signal 124 is inputted into the alarm driving circuit 107 and the boosted voltage obtained from the boosting element 102 is charged and discharged to a piezoelectric element 106, so that a buzzer or alarm sound is generated by the piezoelectric element.

At that time the control signal 124 that is outputted from the alarm signal generating circuit 111 is inputted also into a control signal inhibiting circuit 105. While the control signal 124 is inputted into the control signal inhibiting circuit 105, the control signal inhibiting circuit 105 outputs a control signal 123 so as to disable the boosting signal generating circuit 104 and the discharge signal generating circuit 110 from generating the control signal 120 and the control signal 121, respectively.

By operating in the above described manner, light of the driving element 112 and the piezoelectric element 106 do not occur simultaneously.

Figure 3:
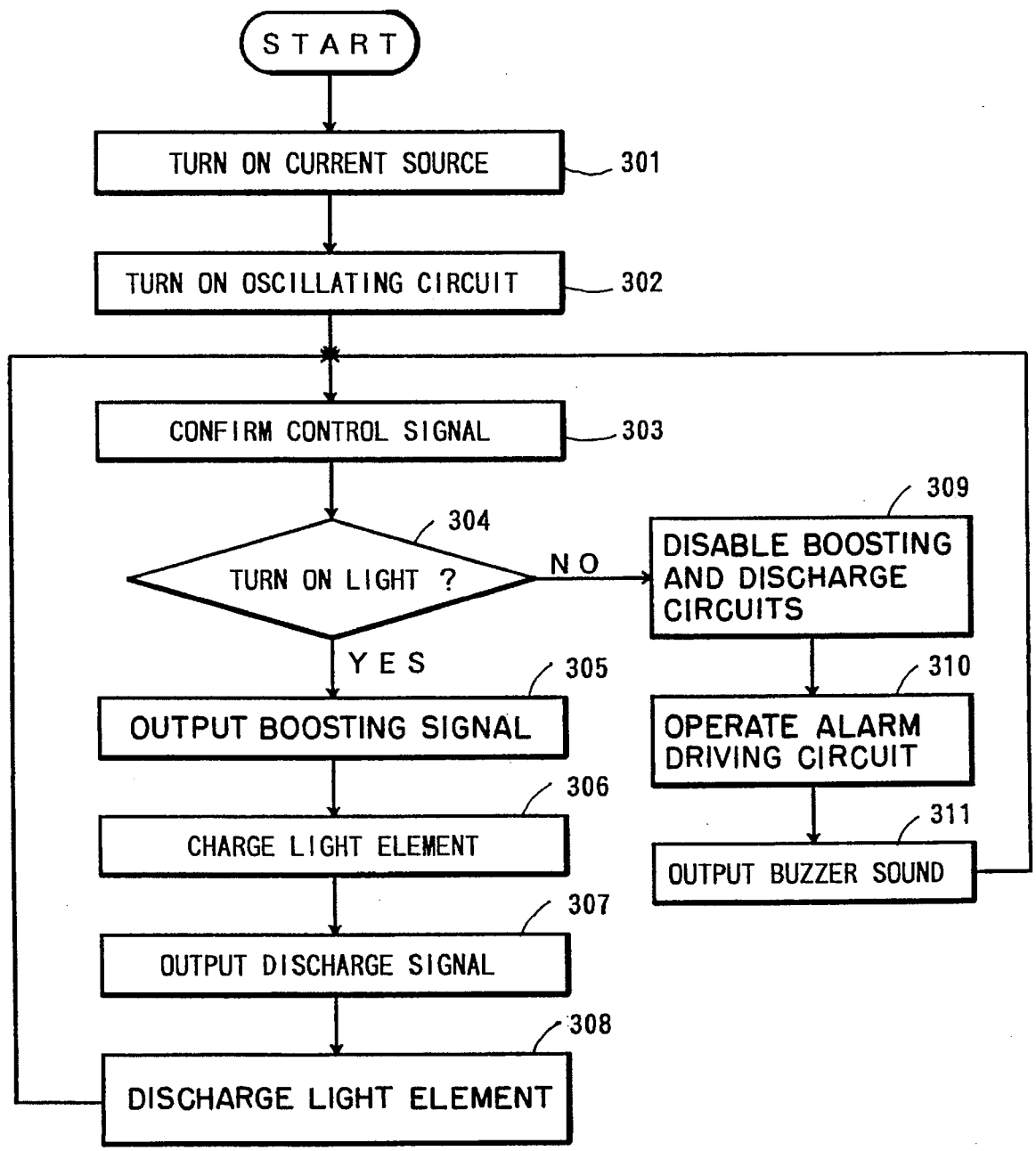
FIG. 3 is a flow chart showing the operation of the first embodiment of the electronic device with display light according to the present invention.

In FIG. 3, a current source is turned on. (Step 301)

The oscillating circuit 109 is then turned on. (Step 302)

The control signal inhibiting circuit 105 confirms the control signal. (Step 303)

Adjustment dependent upon whether dependent upon light is turned on or a buzzer is rung is made. (Step 304)

When the light is turned on, the boosting signal generating circuit 104 outputs the boosting signal. (Step 305)

The light element 112 is charged. (Step 306)

The discharge signal generating circuit 110 outputs a discharge signal after predetermined time. (Step 307)

Electric charge is discharged from the light element (Step 308), and then the process returns to Step 303.

When the light is not turned on, the control signal inhibiting circuit 105 inhibits output of the boosting discharge signal. (Step 309)

The alarm driving circuit 107 charges and discharges the piezoelectric element 106. (Step 310)

The buzzer sound is outputted (Step 311), and the process is then returned to the Step 303.

(2) Second Embodiment

Figure 4:
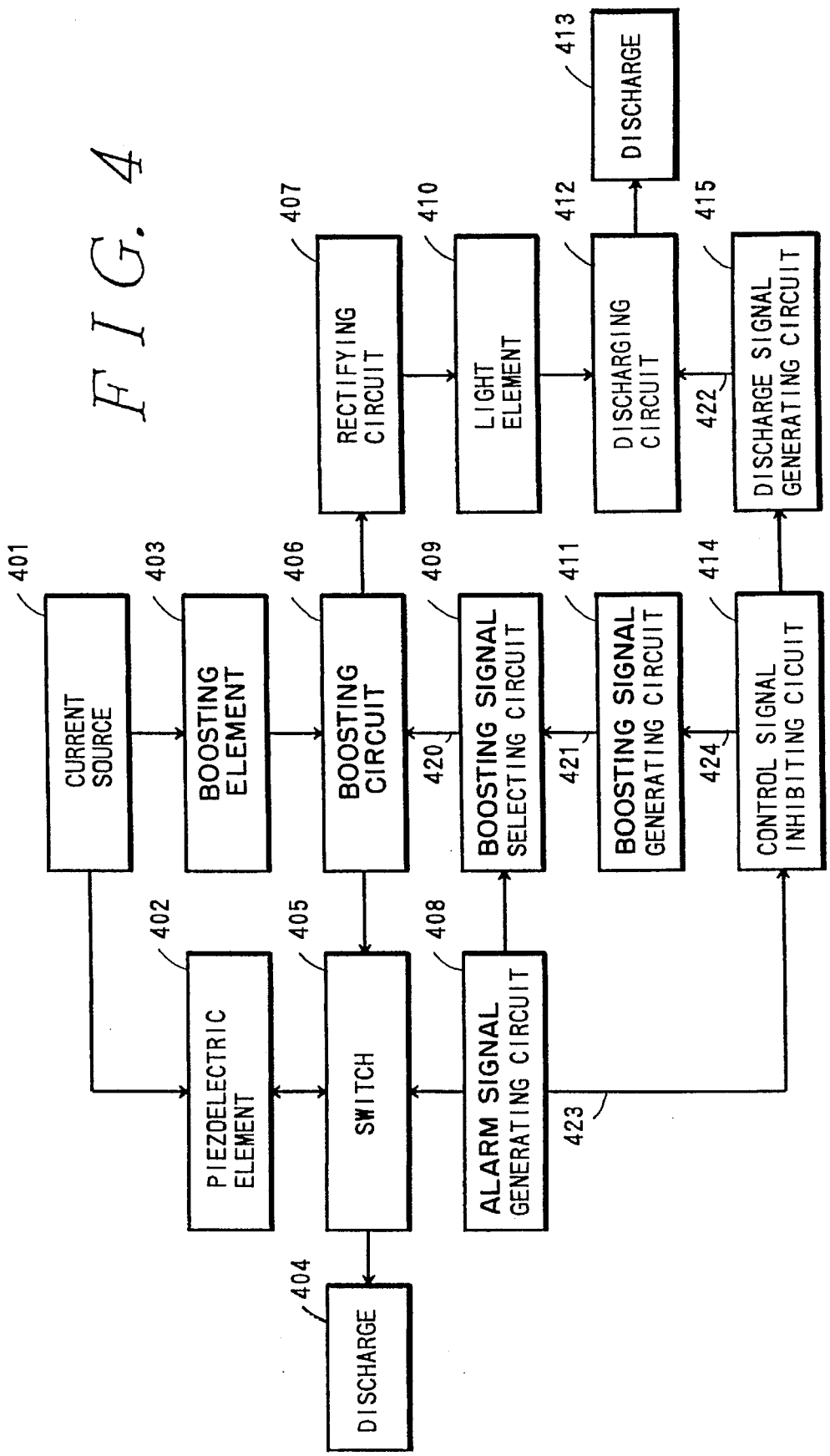
FIG. 4 is a block diagram showing a second embodiment of the electronic device with display light according to the present invention.

In FIG. 4 and FIG. 5, when a current source 401 is turned on, a control signal 421 is outputted from a boosting signal generating circuit 411. The control signal 421 operates as a control signal 420 to drive boosting circuit 406, thereby making the boosting element 403 generate a boosted voltage.

The boosted voltage obtained from the boosting circuit 406 passes through a rectifying circuit 407 and is charged into a light element 410.

A discharge signal generating circuit 415 outputs a control signal 422 before the light element 410 is overcharged. The control signal 422 is inputted into a discharging circuit 412 to discharge the charged light element 410.

Repetition of these operations causes the light element 410 to continuously light.

When a control signal 423 is outputted from a buzzer signal generating circuit 408, a switch 405 is turned on.

When a control signal 423 is inputted into control signal inhibiting means 414, a control signal 424 is outputted therefrom, which disables the boosting signal generating circuit 411 and discharge signal generating circuit 415.

The control signal 423 outputted from the alarm signal generating circuit 408 is also inputted into the boosting signal selecting circuit 409 to make the boosting circuit 406 generate as the control signal 420. The boosted voltage obtained from the boosting circuit 406 in accordance with the control signal 420 is charged and discharged into a piezoelectric element 402 through the switch 405, thereby causing a buzzer sound.

As long as the control signal 423 is outputted from the buzzer signal generating circuit 408, a buzzer continues to sound, and the light element 410 is not charged.

As explained above, the present invention provides an electronic device with light which uses an electroluminescent lamp as a light source. In the inventive device, a lighting function and an alarming function are realized with a single boosting element, and use of a differentiating circuit for generation of a control signal to determine a timing of discharge has beneficial effects in that a display is easy to see and the inventive circuit is reduced in size.

What is claimed is:

1. An electronic device with a display having a light source, comprising: a voltage source for applying a voltage; boosting means for boosting the voltage of the voltage source; boosting control means for controlling the boosting means; rectifying means for rectifying the boosted voltage; a light source driven by the rectified boosted voltage output by the rectifying means; discharging means for discharging the light source; discharge control means for controlling the discharging means to prevent the light source from becoming overcharged; sound generating means for generating an audible sound; alarm control means for generating a control signal for driving the sound generating means; alarm driving means for driving the sound generating means in accordance with the control signal generated by the alarm control means; and light source disable means for recognizing when the sound generating means is activated by discriminating when the control signal is outputted from the alarm control means, and disabling the boosting control means and the discharge control means in response thereto to prevent the simultaneous generation of an alarm and lighting of the display.

2. An electronic device with a display having a light source according to claim 1; wherein the alarm driving means includes means for driving the sound generating means using the boosted voltage output by the boosting means.

3. An electronic device with a display having a light source according to claim 1; wherein the light source disable means includes means for disabling an output from the boosting control means and an output from the discharge control means in accordance with an output from the alarm control means so as to prevent the simultaneous generation of an alarm and lighting of the display.

4. An electronic device with a display having a light source according to claim 1; wherein the light source disable means includes means for disabling an output from the boosting control means and the discharge control means in accordance with an output of the alarm control means, and wherein the alarm driving means includes means for charging the sound generating means with the boosted voltage and for discharging the sound generating means.

5. An electronic device according to claim 1; wherein the sound generating means comprises a piezoelectric element.

6. An electronic device according to claim 1; wherein the light source comprises an electroluminescent element.

7. An electronic device with a display having a light source, comprising: light source driving means for driving a light source; sound generating means for generating an audible sound in accordance with an alarm signal; alarm signal generating means for generating an alarm signal for controlling the sound generating means; a power source for supplying a voltage for selectively driving one of the light source and the sound generating means; discharge means for discharging the light source to prevent the light source from becoming overcharged; and means for preventing operation of the light source driving means in accordance with a signal outputted from the alarm signal generating means, such that simultaneous operation of the light source and the sound generating means is prevented.

8. An electronic device according to claim 7; wherein the light source comprises an electroluminescent element.

9. An electronic device according to claim 7; wherein the light source comprises a light emitting diode.

10. An electronic device according to claim 7; wherein the light source comprises a heating bulb.

11. An electronic device according to claim 7; wherein the sound generating means comprises a piezoelectric element.

12. An electronic device with a display having a light source, comprising: a voltage source for generating a voltage; boosting means for boosting the voltage to a dischargeable stepped-up voltage; light source driving means for driving the light source by discharging the stepped-up voltage; sound generating means for generating an audible sound; alarm means for driving the sound generating means by discharging stepped-up voltage; and control means for preventing the simultaneous lighting of the display and generating of an alarm such that the light source and the sound generating means may be driven by a single boosting means.

13. An electronic device according to claim 12; wherein the boosting means comprises an oscillator circuit, a charge boosting circuit and a charge boosting element.

14. An electronic device according to claim 12; wherein the voltage source comprises a current source for outputting a current, and a charge boosting element charged by the current for outputting a voltage.

15. An electronic device according to claim 12; wherein the light source driving means includes means for repetitively charging and discharging the light source with the boosted voltage to prevent the light source from becoming overcharged.

16. An electronic device according to claim 12; wherein the control means includes means for disabling the light source driving means when the sound generating means is activated.

17. An electronic device according to claim 12; wherein the sound generating means is a piezoelectric element.

18. An electronic device according to claim 12; wherein the light source is an electroluminescent element.

19. An electronic device according to claim 12; wherein the light source is an LED.

20. An electronic device according to claim 12; wherein the light source is a heating lamp.

* * * * *